(12) United States Patent
Gudlavenkatasiva et al.

(10) Patent No.: US 8,879,709 B2
(45) Date of Patent: Nov. 4, 2014

(54) MANAGEMENT OF NATIONAL TELEPHONE AND ADDRESS SYSTEM (NTAS) DATA

(75) Inventors: Bhaskar R. Gudlavenkatasiva, Tampa, FL (US); Maruf Ahmed, Tampa, FL (US); Sutap Chatterjee, Tampa, FL (US); Pradeepan Ravindranathan, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1322 days.

(21) Appl. No.: 12/573,401

(22) Filed: Oct. 5, 2009

(65) Prior Publication Data
US 2011/0081012 A1    Apr. 7, 2011

(51) Int. Cl.
*H04M 7/00*    (2006.01)

(52) U.S. Cl.
USPC ............. 379/221.14; 379/220.01; 379/221.04

(58) Field of Classification Search
CPC ... H04M 3/42; H04M 3/42297; H04Q 3/0029
USPC .................. 379/219, 220.01, 221.01, 221.02, 379/221.04, 221.14, 242
See application file for complete search history.

(56) References Cited

U.S. PATENT DOCUMENTS

| | | | |
|---|---|---|---|
| 7,154,901 B2 * | 12/2006 | Chava et al. | 370/401 |
| 8,045,692 B2 * | 10/2011 | Schultz | 379/219 |
| 2007/0189491 A1 * | 8/2007 | Rao | 379/220.01 |
| 2007/0192290 A1 * | 8/2007 | Zaytsev et al. | 707/3 |

OTHER PUBLICATIONS

Cisco BTS 10200 Softswitch Routing and Dial Plan Guide, Local Exchange Routing Guide, Dec. 9, 2008.*

* cited by examiner

*Primary Examiner* — Nafiz E Hoque (57) ABSTRACT

A method includes receiving Local Exchange Routing Guide (LERG) telephone number (TN) data; comparing the LERG TN data with telephone service provider (TSP) TN data; determining whether one or more differences exist between the LERG TN data and the TSP TN data based on the comparing; generating one or more executable statements for updating the one or more differences that exist based on the comparing; and executing the one or more executable statements to match the TSP TN data with the LERG TN data.

20 Claims, 12 Drawing Sheets

MANAGEMENT OF NATIONAL TELEPHONE AND ADDRESS SYSTEM (NTAS) DATA

BACKGROUND

Telephone service providers maintain large repositories of telephone numbers and other telephone-related information that continually needs to be updated and maintained. For example, governmental regulations and administrative directives from various entities associated with the North American Numbering Plan Administration (NANPA) infrastructure require telephone number (TN) inventory to be managed and maintained in synchronization with other internal and/or external industry databases, such as, a Local Exchange Routing Guide (LERG).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "TN data," as used herein, is intended to be broadly interpreted to include telephone numbers and metadata associated with the telephone numbers. The metadata may include, for example, data that indicates which network switch serves a particular telephone number, geographic data (e.g., a state, a city, or the like) with which a telephone number is associated, rate center data (e.g., taxes, fees, tariffs, charges, etc. associated with a telephone number), and/or pooling data. Pooling data may indicate whether the telephone numbers are being received from, for example, a pooling administrator, or being returned back to the pooling administrator.

As will be described herein, methods, devices, and/or systems may provide for the management of TN data in accordance with the LERG and/or other various governmental agencies, regulations, directives, and/or the like. In an exemplary implementation, TN data may be received from the LERG and compared to TN data managed by a telephone service provider (TSP). If LERG TN data includes TN data that is not present in the TSP TN data, the missing TN data may be added to the TSP TN data. For example, in an exemplary implementation, an executable statement (e.g., a Structured Query Language (SQL) statement) may be automatically generated to add the TN data to the TSP TN data based on a result of the comparison. Additionally, if TSP TN data includes TN data that is not present in the LERG TN data, the TSP TN data may be deleted. For example, an executable statement (e.g., an SQL statement) may be automatically generated to delete the TN data from the TSP TN data based on a result of the comparison.

Upon generation of the executable statements, in one implementation, administrators may review results of the comparison between the TSP TN data and the LERG TN data before executing the executable statements. For example, a report may be automatically generated that indicates the differences between the TSP TN data and the LERG TN data, and includes the executable statements and/or the proposed updates. In other implementations, the executable statements may be automatically executed and correspondingly the TSP TN data may be updated without human intervention. Depending on the type of TN data (e.g., metadata or telephone numbers) to be updated, network devices (e.g., telephone switches) data may be automatically updated; rate center data, geographical data, and/or pooling data may be automatically updated; and/or other TSP TN databases (e.g., in a nationally distributed TSP system) may be automatically updated.

Figure 1A:
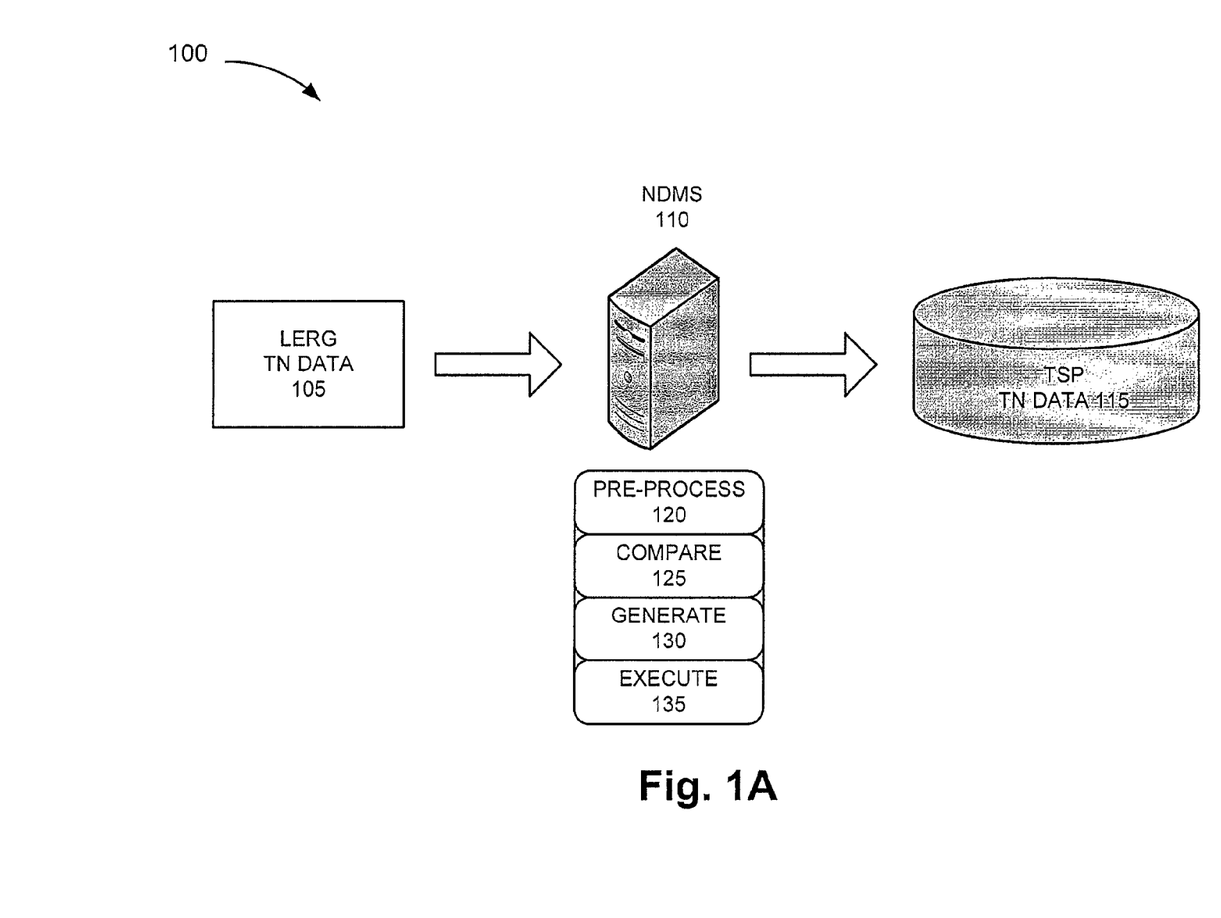
FIGS. 1A-1C are diagrams illustrating an exemplary environment in which telephone service provider (TSP) TN data may be automatically updated based on LERG TN data.
Figure 1B:
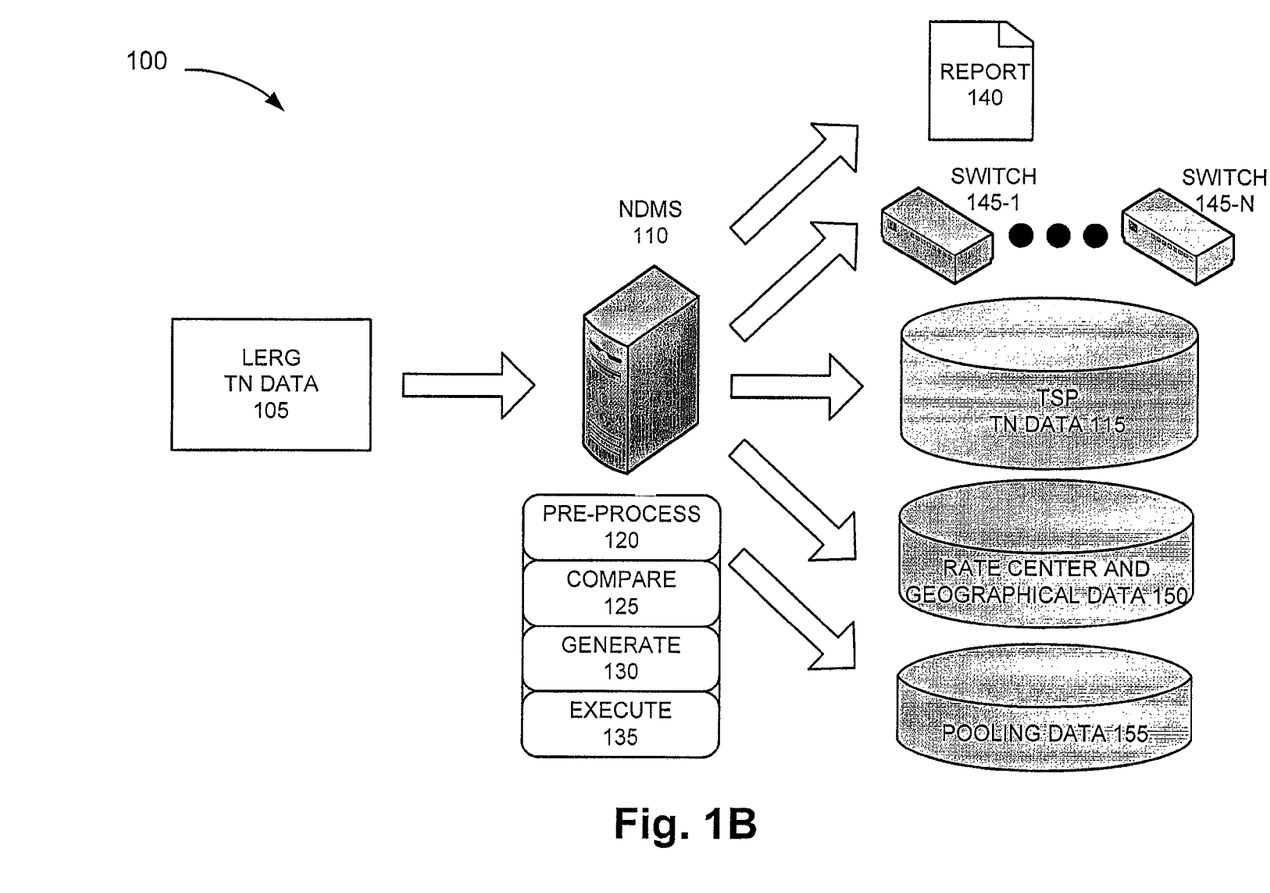
Figure 1C:
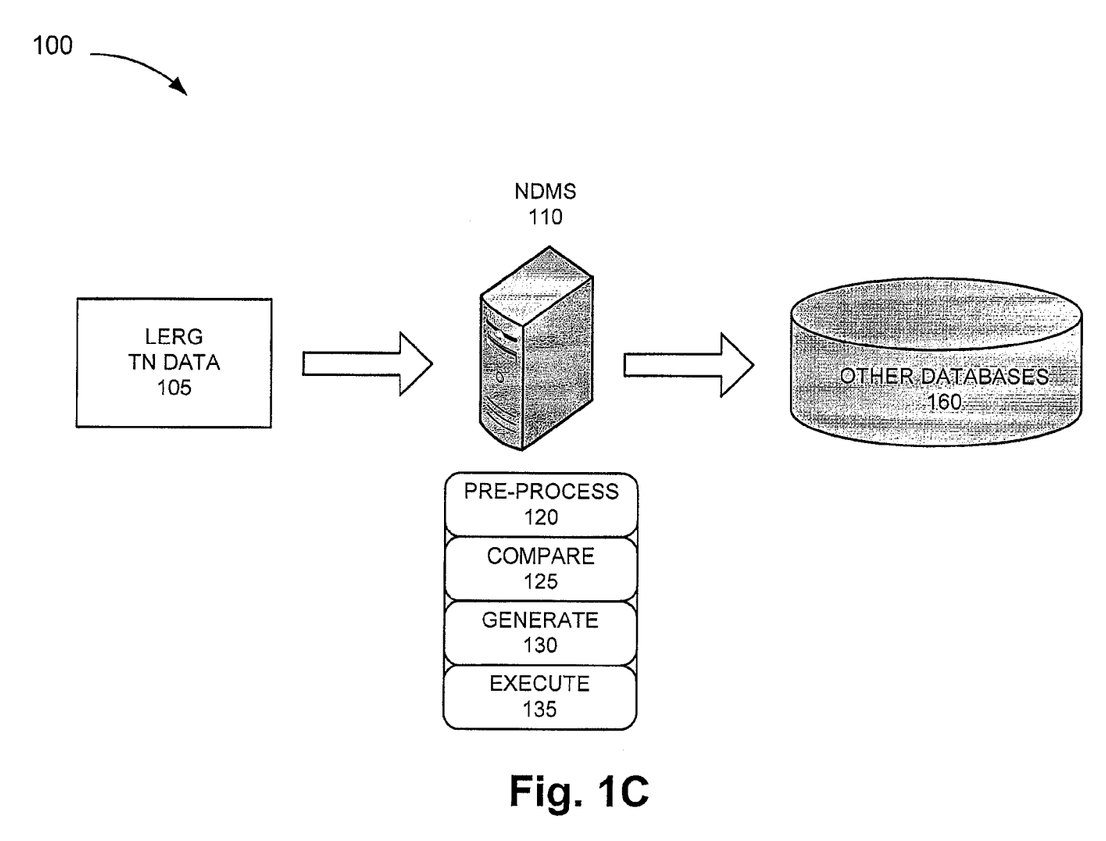

FIGS. 1A-1C are diagrams illustrating an exemplary environment 100 in which TSP TN data may be automatically updated based on LERG TN data. As illustrated in FIG. 1A, environment 100 may include LERG TN data 105 (e.g., provided in a database stored on a device (not shown)), a National Telephone and Address System (NTAS) Data Management System (NDMS) 110, and TSP TN data 115 (e.g., provided in a database stored on a device (not shown)).

The number of devices and configuration in environment 100 is exemplary and provided for simplicity. In practice, environment 100 may include more, fewer, different devices, and/or differently arranged devices than those illustrated in FIG. 1. Also, some functions described as being performed by NDMS 110 may be performed by a combination of devices.

LERG TN data 105 may include, among other data, TN data. LERG TN data 105 may support the current local exchange network within the North American Numbering Plan (NANP) and may identify reported planned changes in a telephone network (e.g., a Public Switched Telephone Network (PSTN)). A TSP may subscribe for periodic updates of LERG TN data 105. LERG TN data 105 may be stored in a database or some other type of repository.

NDMS 110 may include one or more network devices that process LERG TN data 105, compares TSP TN data 115 with LERG TN data 105, and updates TSP TN data 115 based on LERG TN data 105. NDMS 110 may update other devices, databases, and/or systems associated with the TSP and/or other entities. In an exemplary implementation, NDMS 110 may include one or more computers configured to manage TN data as described herein. For example, NDMS 110 may include one or more applications, databases, user interfaces, and communication modules. In one implementation, NDMS 110 may include a network device, such as a gateway, a hub, a proxy server, or some other type of device that processes and/or transfers data, a server device, or another type of computation or communication device that gathers, processes, searches, and/or provides information in a manner described herein.

TSP TN data 115 may include, among other data, TN data. TSP TN data 115 may be stored in a database or some other type of repository.

Referring to FIG. 1A, in an exemplary process, LERG TN data 105 may be received by NDMS 110. In one implementation, LERG TN data 105 may correspond to raw (e.g., unprocessed) LERG TN data. In such instances, NDMS 110 may preprocess 120 LERG TN data 105 based on a format associated with TSP TN data 115. In other implementations, LERG TN data 105 may be received in a format that NDMS 110 may not preprocess 120.

NDMS 110 may compare 125 LERG TN data 105 with TSP TN data 115. For example, NDMS 110 may load both LERG TN data 105 and TSP TN data 115 into a database (not illustrated) and compare 125 the loaded LERG TN data 105 and TSP TN data 115. Assuming differences exist between the compared LERG TN data 105 and TSP TN data 115, NDMS 110 may automatically generate 130 executable statements (e.g., SQL statements) that address the differences between the compared LERG TN data 105 and TSP TN data 115. For example, if LERG TN data 105 includes TN data that is not present in TSP TN data 115 and/or if TSP TN data 115 includes TN data that is not present in LERG TN data 115, NDMS 110 may generate executable statements that adds, deletes, and/or updates TSP TN data 115.

Referring to FIG. 1B, as previously described, NDMS 110 may generate a report 140 that indicates differences between TSP TN data 115 and LERG TN data 105, and includes the executable statements and/or the proposed updates to TSP TN data 115 based on the comparison. Administrators may review report 140, and may accept or decline one or more of the updates to TSP TN data 115. In other implementations, NDMS 110 may not generate report 140 and/or human review and/or human approval of the updates to TSP TN data 115 may not be needed. Rather, NDMS 110 may automatically execute 135 the executable statements against TSP TN data 115 as well as perform other updating procedures, as described in greater detail below.

In an exemplary implementation, it may be assumed that administrators reviewed report 140 and accepted the updates to TSP TN data 115. In such an instance, NDMS 110 may execute 135 the executable statements against TSP TN data 115. In addition, depending on the differences between TSP TN data 115 and LERG TN data 115, other updating procedures may be performed. For example, NDMS 110 may update switch data associated with one or more switches (e.g., switches 145-1 to 145-N (where N≥1), referred to collectively as "switches 145" and singularly as "switch 145"), which may be included in a telephone network. For example, the updated switch data may permit an internal code throw or a switch conversion to be performed. An internal code throw procedure may include, for example, moving code (e.g., configuration data) associated with one switch 145 to another switch 145. Typically, switches 145 involved in an internal code throw procedure belong to a same rate center. A switch conversion procedure may include, for example, an internal code throw procedure, except that one switch 145 may be removed from operation in the telephone network. Typically, switch 145 that is removed corresponds to a legacy device.

NDMS 110 may update rate center and geographical data 150 and/or pooling data 155 based on the comparison between LERG TN data 105 and TSP TN data 115. The updating of pooling data 155 may include releasing telephone numbers back to or capturing telephone numbers from, a pooling administrator or a telephone number provider. Referring to FIG. 1C, NDMS 110 may update other databases 160, information in other network elements associated with the telephone network, and/or other systems associated with the provisioning of service by the TSP.

As a result of the foregoing, changes in LERG TN data 105 may be automatically applied to TSP TN data 115, without human intervention and possible error. Additionally, or alternatively, network devices and/or other databases may be automatically updated based on the updated TSP TN data 115.

Since exemplary implementations have been broadly described, variations to the above implementations will be discussed further below.

Figure 2A:
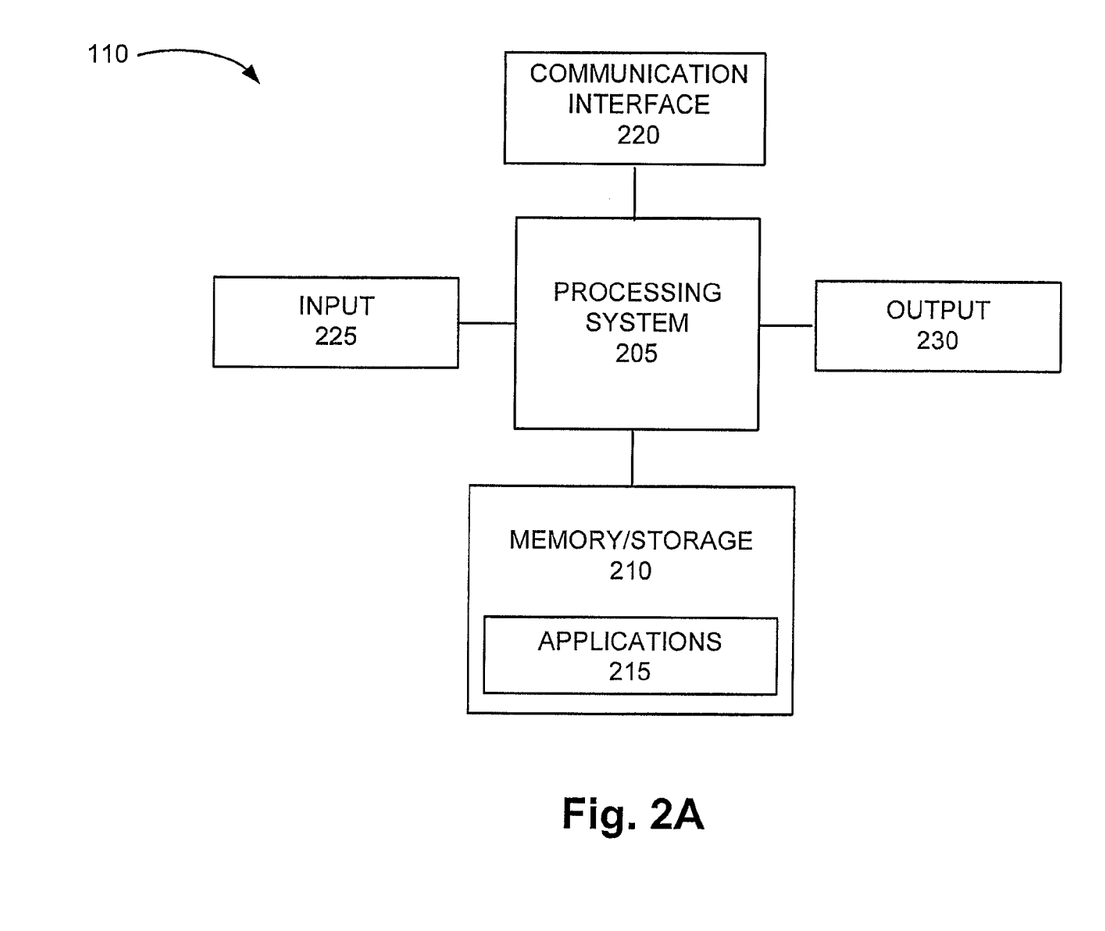
FIG. 2A is a diagram illustrating exemplary components of a National Telephone and Address System (NTAS) Data Management System (NDMS)

FIG. 2A is a diagram illustrating exemplary components of NDMS 110. As illustrated, NDMS 110 may include a processing system 205, memory/storage 210 including applications 215, a communication interface 220, an input 225, and an output 230. In other implementations, NDMS 110 may include fewer, additional, and/or different components, and/or a different arrangement of components than those illustrated in FIG. 2A and described herein. Additionally, in other implementations, some functions described as being performed by a particular component of NDMS 110 may be performed by a different component or a combination of components of NDMS 110.

Processing system 205 may include one or more processors, microprocessors, data processors, co-processors, network processors, application specific integrated circuits (ASICs), controllers, programmable logic devices (PLDs), chipsets, field programmable gate arrays (FPGAs), application specific instruction-set processors (ASIPs), system-on-chips (SOCs), and/or some other component that may interpret and/or execute instructions and/or data. Processing system 205 may control the overall operation, or a portion thereof, of NDMS 110, based on, for example, an operating system (not illustrated) and/or various applications (e.g., applications 215). Processing system 205 may access instructions from memory/storage 210, from other components of NDMS 110, and/or from a source external to NDMS 110 (e.g., a network or another device).

Memory/storage 210 may include memory and/or secondary storage. For example, memory/storage 210 may include a random access memory (RAM), a dynamic random access memory (DRAM), a ferroelectric random access memory (FRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices. The computer-readable medium may store data, application(s), and/or instructions configured to implement one or more embodiments of NDMS 110.

Memory/storage 210 may store data, application(s), and/or instructions related to the operation of NDMS 110. For example, memory/storage 210 may include applications 215 that provide for the management of TN data in accordance with the LERG and/or other various governmental regulations, agencies, directives, and/or the like, as described herein.

Communication interface 220 may permit NDMS 110 to communicate with other devices, networks, and/or systems. For example, communication interface 220 may include some type of wireless and/or wired interface.

Input 225 may permit a user and/or another device to input information into NDMS 110. For example, input 225 may include a keyboard, a keypad, a button, a switch, a knob, fingerprint recognition logic, retinal scan logic, a web cam, voice recognition logic, a touchpad, an input port, a microphone, a display, and/or some other type of input component.

Output 230 may permit NDMS 110 to output information to a user and/or another device. For example, output 230 may include a display, light emitting diodes (LEDs), an output port, a speaker, and/or some other type of output component.

As described herein, NDMS 110 may perform certain operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 2B:
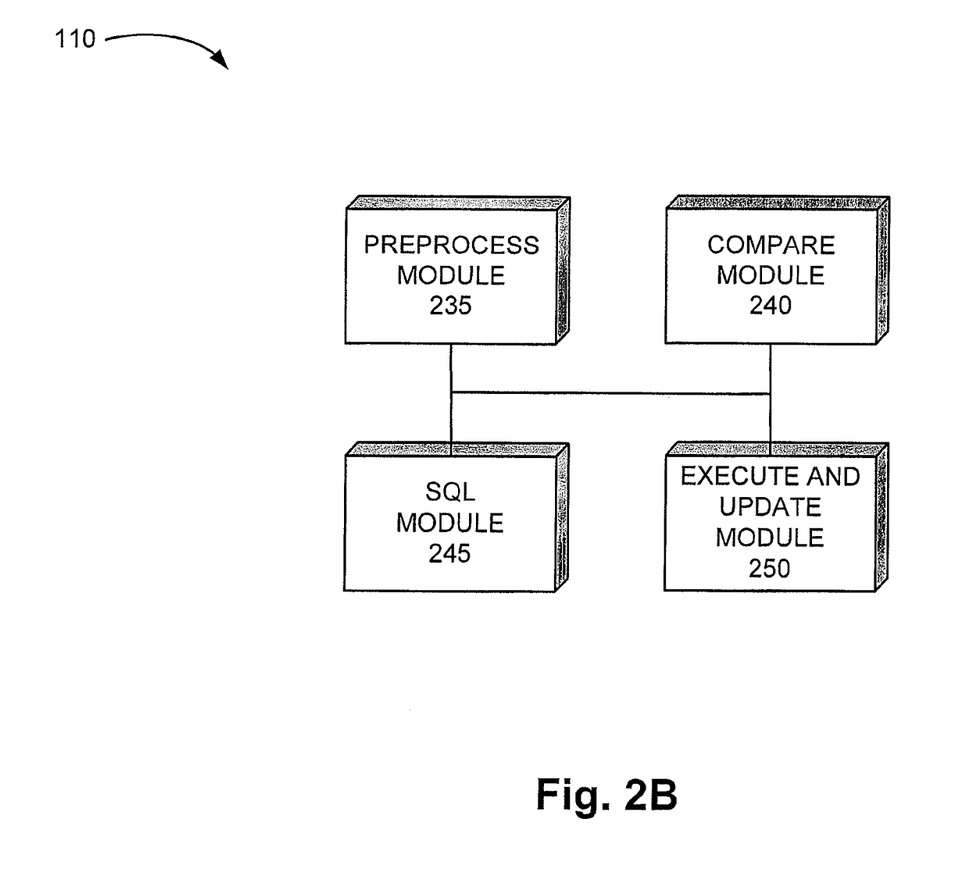
FIG. 2B is a diagram illustrating exemplary functional component associated with the NDMS.

FIG. 2B is a diagram illustrating exemplary functional component associated with NDMS 110. As illustrated in FIG. 2B, NDMS 110 may include a preprocess module 235, a compare module 240, an SQL module 245, and an execute and update module 250. Preprocess module 235, compare module 240, SQL module 245, and/or execute and update module 250 may be implemented as a combination of hardware and software (e.g., applications 215) based on the components illustrated and described with respect to FIG. 2A. Alternatively, preprocess module 235, compare module 240, SQL module 245, and/or execute and update module 250 may be implemented as hardware based on the components illustrated and described with respect to FIG. 2A.

Preprocess module 235 may convert and/or reformat LERG TN data 105. For example, depending on a format of LERG TN data 105 and/or TSP TN data 115, data conversion and/or data reformatting may be needed to perform comparison, updating, and/or management of TN data. Preprocess module 235 may preprocess LERG TN data 105 based on a format of TSP TN data 115. In other implementations, preprocess module 235 may not need to convert and/or reformat LERG TN data 105. The data conversion and/or data reformatting performed by preprocess module 235 may facilitate a comparison between LERG TN data 105 and TSP TN data 115. In one implementation, preprocess module 235 may load formatted LERG TN data 105 and TSP TN data 115 into a database in which a comparison between LERG TN data 105 and TSP TN data 115 may be performed.

Compare module 240 may compare LERG TN data 105 with TSP TN data 115. Compare module 240 may identify differences between LERG TN data 105 and TSP TN data 115. For example, LERG TN data 105 may include TN data that is not present in TSP TN data 115. Additionally, or alternatively, TSP TN data 115 may include TN data that is not present in LERG TN data 105.

SQL module 245 may generate SQL statements based on the comparison between LERG TN data 105 and TSP TN data 115. For example, an SQL statement may, when executed, delete TN data, add TN data, or update TN data (e.g., associate metadata with another telephone number, switch 145, etc.; move TN data (e.g., a telephone number) to another geographic location, rate center, etc.; and/or manage the release and capture of telephone numbers). In one implementation, SQL module 245 may generate a report (e.g., report 140) that includes differences between LERG TN data 105 and TSP TN data 115; generated SQL statements; and/or other information relating to the updating of TN data, other databases 160, information in other network elements associated with the telephone network, and/or other systems associated with the provisioning of service by the TSP. In other implementations, SQL module 245 may not generate report 140.

Execute and update module 250 may execute SQL statements against TN data. For example, execute and update module 250 may execute SQL statements against TSP TN data 115. In one implementation, execute and update module 250 may execute SQL statements in response to a user input (e.g., a network administrator) indicating approval of the generated SQL statements based on report 140. In other implementations, execute and update module 250 may automatically execute SQL statements against TSP TN data 115 without receiving the user input. Execute and update module 250 may update of other databases 160, information in other network elements associated with the telephone network, and/or other systems associated with the provisioning of service by the TSP.

Although FIG. 2B illustrates exemplary functional components of NDMS 110, in other implementations, NDMS 110 may include fewer, additional, different, and/or a different arrangement of functional components than those illustrated and described with respect to FIG. 2B. Additionally, or alternatively, one or more operations described as being performed by a particular functional component may be performed by one or more other functional components, in addition to or instead of the particular functional component.

As previously described, NDMS 110 may provide for the management of TN data in accordance with the LERG and/or other various governmental regulations, agencies, directives, and/or the like. Described below are exemplary operations that may be performed by the functional components of NMDS 110 to provide for the management of TN data.

Figure 3A:
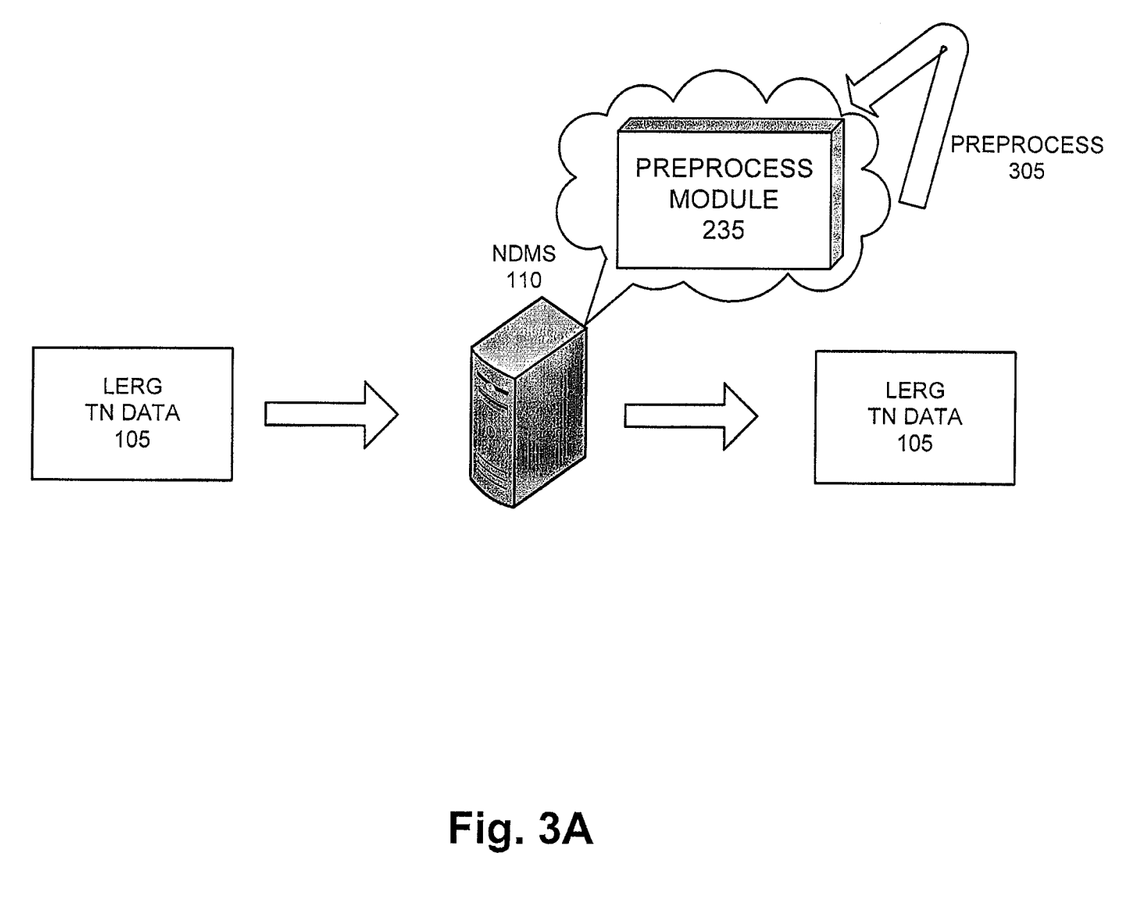
FIGS. 3A-3D are diagrams illustrating exemplary operations performed by the NDMS.

FIGS. 3A-3D are diagrams illustrating exemplary operations capable of being performed by NDMS 110. Referring to FIG. 3A, preprocess module 235 may receive LERG TN data 105. Preprocess module 235 may preprocess 305 the received LERG TN data 105. For example, LERG TN data 105 may require data conversion, data reformatting, and/or some other type of preprocessing to facilitate a comparison between LERG TN data 105 and TSP TN data 115. Alternatively, LERG TN data 105 may not require data conversion, data reformatting, and/or some other type of preprocessing to facilitate a comparison between LERG TN data 105 and TSP TN data 115. Preprocess module 235 may provide (preprocessed) LERG TN data 105 to compare module 240.

Figure 3B:
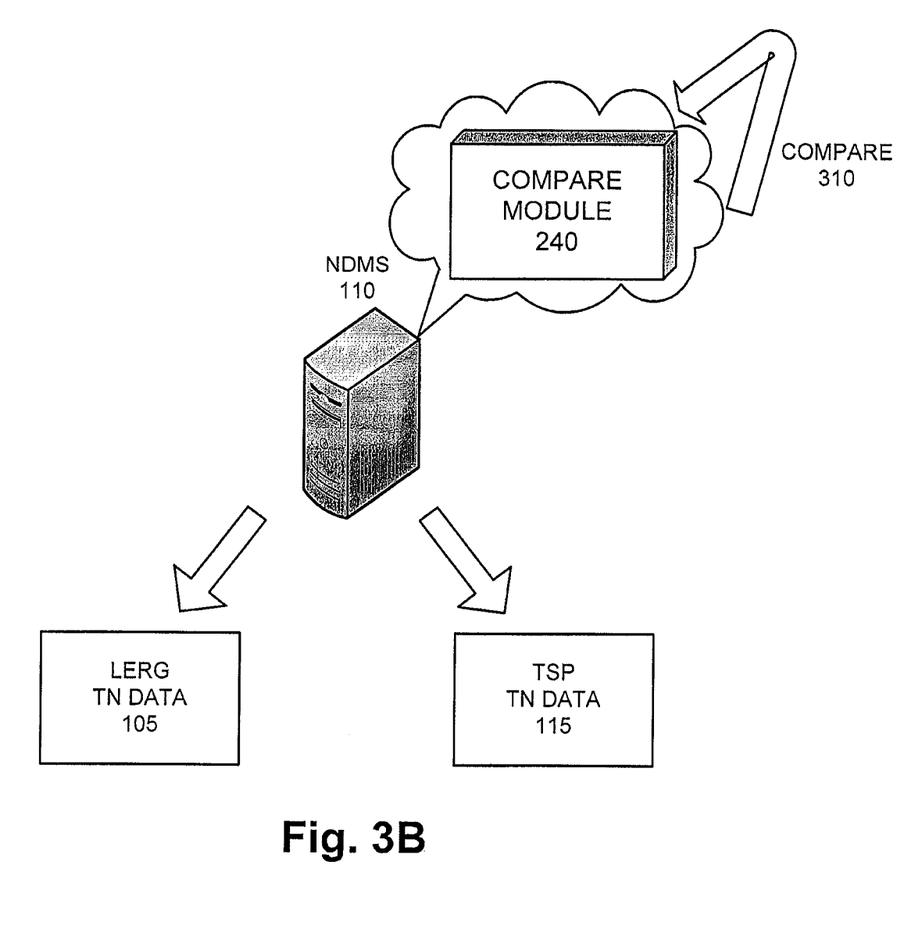

Referring to FIG. 3B, compare module 240 may compare 310 LERG TN data 105 with TSP TN data 115. Compare module 240 may identify differences between LERG TN data 105 and TSP TN data 115. For example, LERG TN data 105 may include TN data that is not present in TSP TN data 115. Additionally, or alternatively, TSP TN data 115 may include TN data that is not present in LERG TN data 105.

Figure 3C:
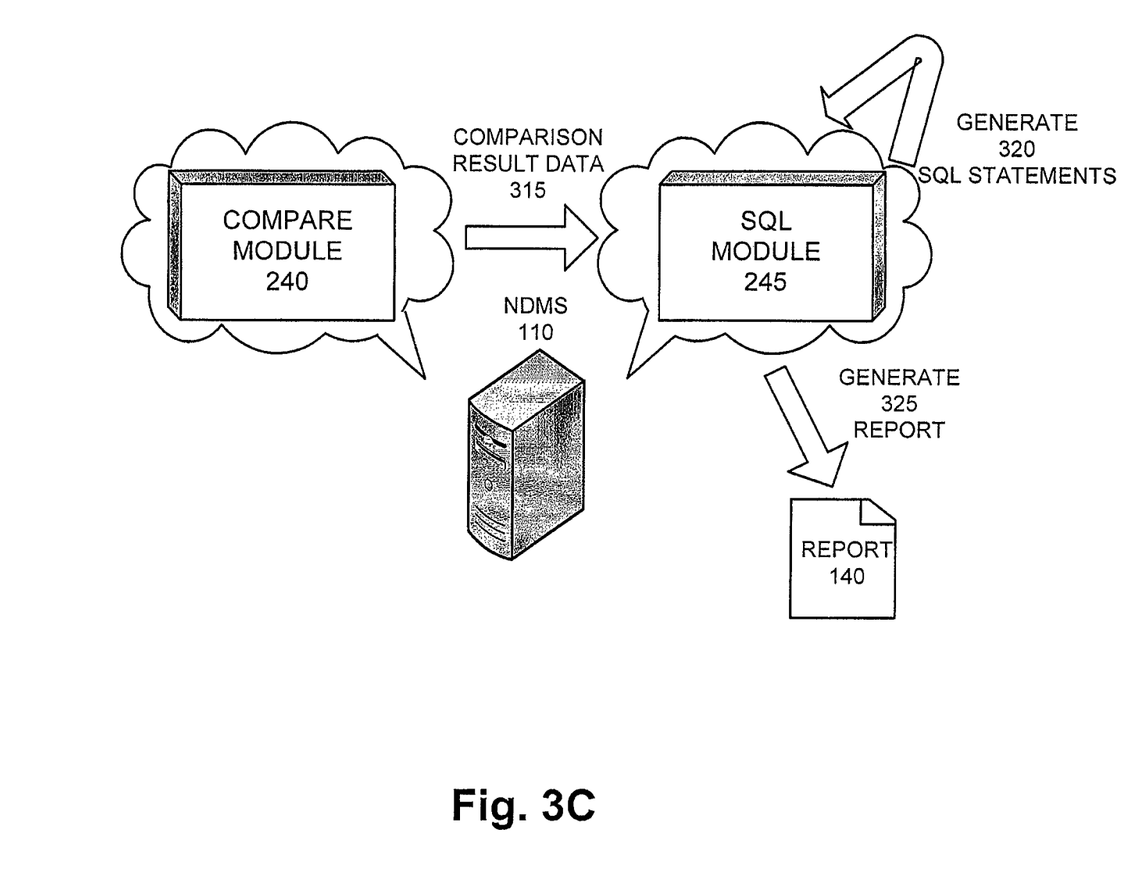

As illustrated in FIG. 3C, compare module 240 may provide comparison result data 315, which represents a result of the comparison performed, to SQL module 245. SQL module 245 may generate 320 SQL statements based on comparison result data 315. As previously described, these SQL statements may, when executed, delete TN data, add TN data, and/or update TN data.

In one implementation, SQL module 245 may generate 325 report 140. Report 140 may indicate, for example, differences between LERG TN data 105 and TSP TN data 115, and may include the generated SQL statements and/or other information relating to updating of TN data, other databases 160, information in other network elements associated with the telephone network, and/or other systems associated with the provisioning of service by the TSP. In other implementations, SQL module 245 may not generate the report.

Figure 3D:
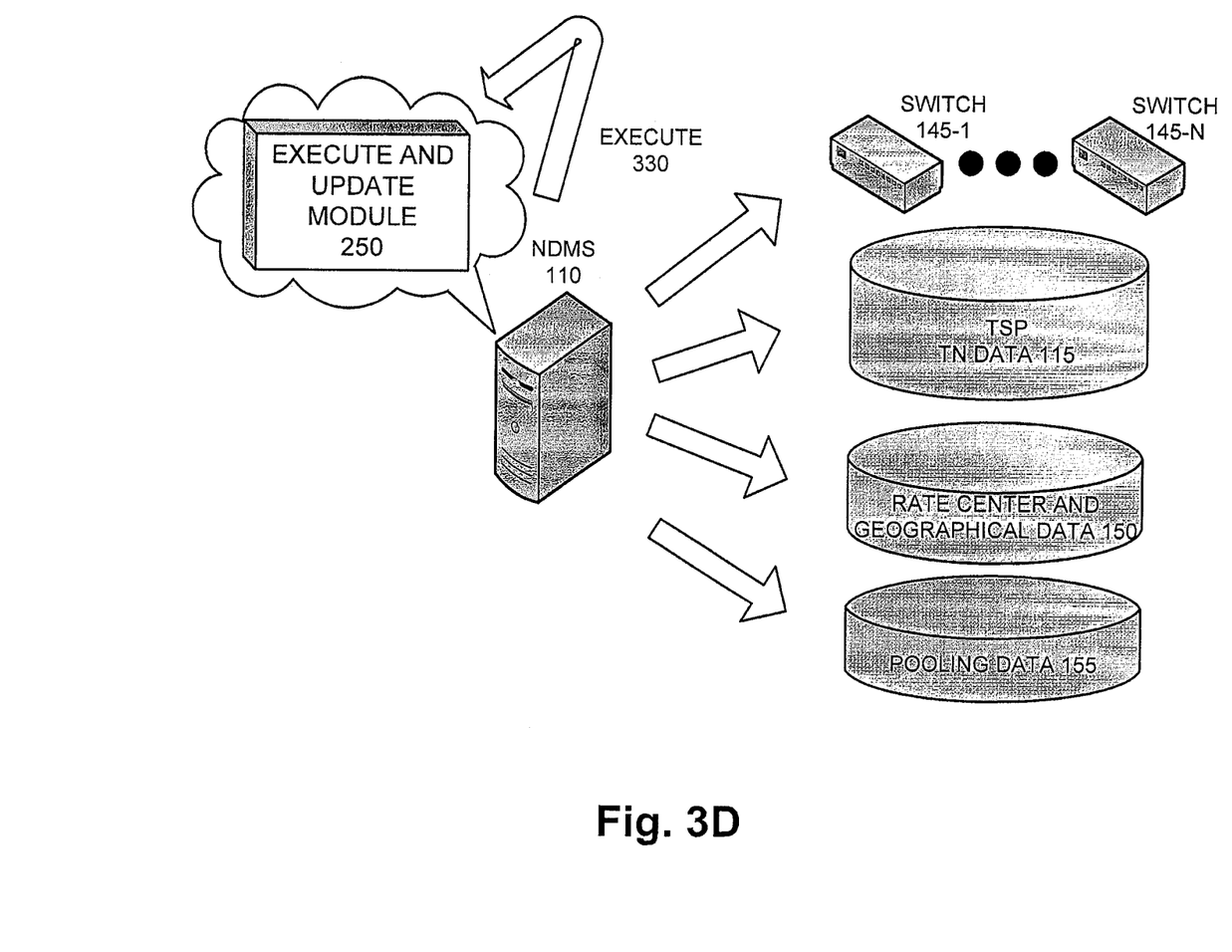

Referring to FIG. 3D, execute and update module 250 may execute 330 SQL statements against TN data 115. Execute and update module 250 may execute 330 SQL statements in response to a user input or automatically without receiving the user input. Depending on the differences between TSP TN data 115 and LERG TN data 115, NDMS 110 may perform, automatically or based on user input, other updating procedures. For example, NDMS 110 may update switch data (or some other type of network device data) associated with a telephone network. In an implementation, an internal code throw or a switch conversion may be performed based on the updated switch data. For example, a device and/or an administrator of the telephone network may utilize the updated switch data in TSP TN data 115 to perform the internal code throw and/or the switch conversion.

Execute and update module 250 may update rate center and geographical data 150 and/or pooling data 155 based on the comparison between LERG TN data 105 and TSP TN data 115. The updating of pooling data 155 may include releasing telephone numbers back to or capturing telephone numbers from, a telephone number provider or a pooling administrator. Execute and update module 250 may update other databases 160, information in other network elements associated with the telephone network, and/or other systems associated with the provisioning of service by the TSP.

Although FIGS. 3A-3D illustrate exemplary operations performed by NDMS 110, in other implementations, NDMS 110 may include fewer, additional, and/or different operations than those described and illustrated with respect to FIGS. 3A-3D.

Figure 4A:
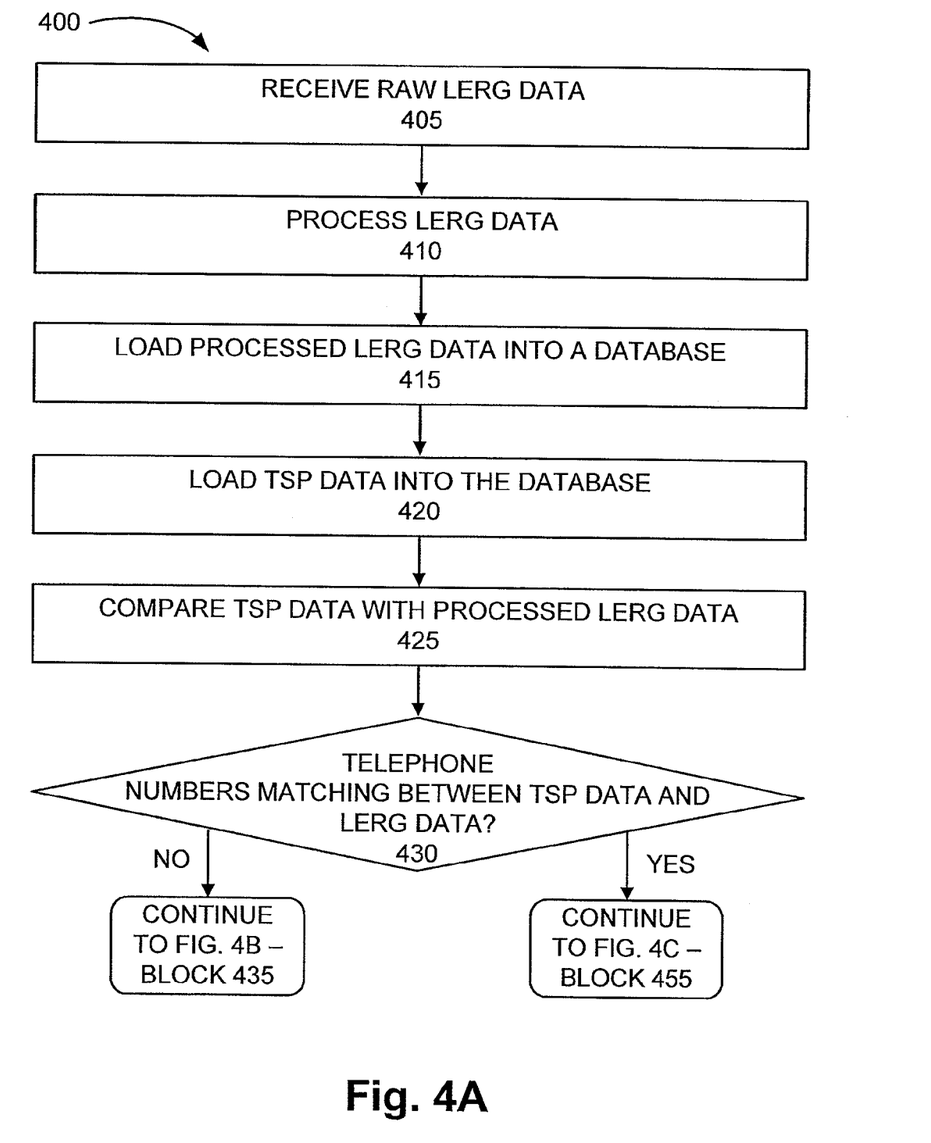
FIGS. 4A-4C are flow diagrams illustrating an exemplary process in which TSP TN data may be automatically updated based on LERG TN data.
Figure 4B:
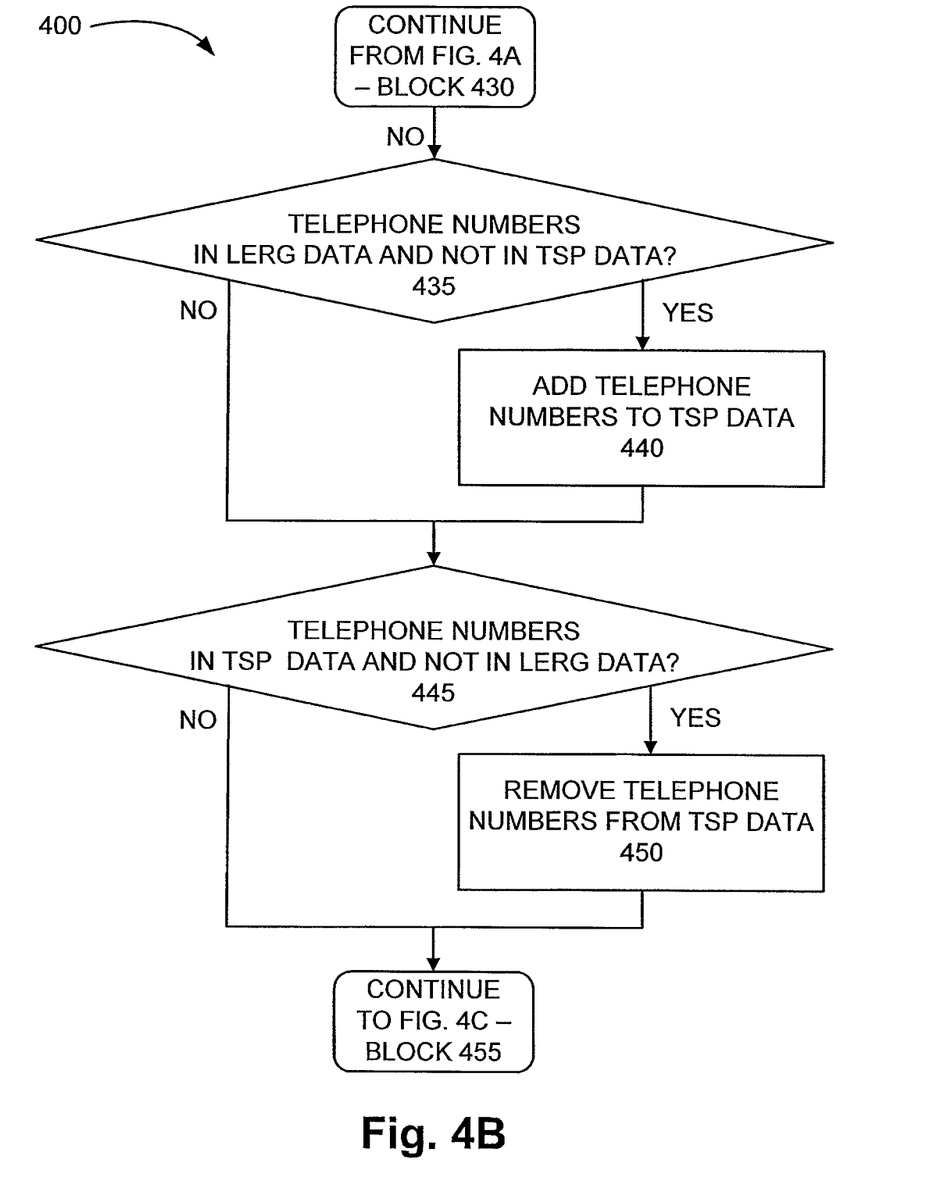
Figure 4C:
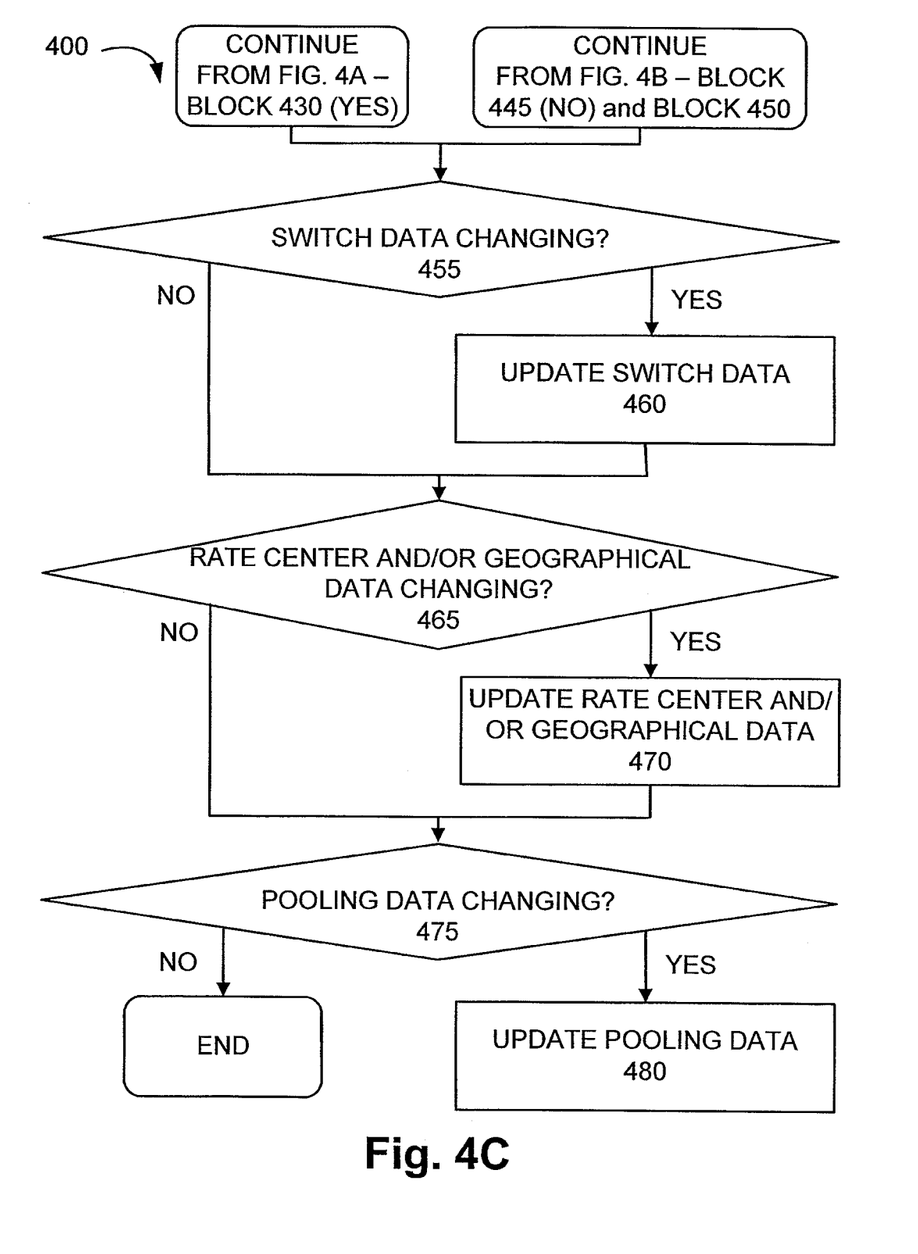

FIGS. 4A-4C are flow diagrams illustrating an exemplary process 400 in which TSP TN data may be automatically updated based on LERG TN data. In one implementation, process 400 may be performed by NDMS 110. In another implementation, some or all of process 400 may be performed by another device or a group of devices, including or excluding NDMS 110.

As shown in FIG. 4A, process 400 may include receiving raw LERG TN data (block 405). For example, NDMS 110 may receive raw (unprocessed) LERG TN data 105. NDMS 110 may pass the received raw LERG TN data 105 to preprocess module 235.

The raw LERG TN data may be processed (block 410). For example, preprocess module 235 may receive raw LERG TN data 105. Depending on a format of raw LERG TN data 105 and/or a format of TSP TN data 115, data conversion and/or data reformatting may be needed to perform comparison, updating, and/or management of TSP TN data 115.

The LERG TN data may be loaded into a database (block 415). For example, preprocess module 235 may load processed LERG TN data 105 into a database. The database may correspond to a workspace for comparing LERG TN data 105 with TSP TN data 115 and may be provided in NMDS 110 (e.g., in memory/storage 210).

The TSP TN data may be loaded into the database (block 420). For example, preprocess module 235 may load TSP TN data 115 into the database.

The TSP TN data may be compared with the LERG TN data (block 425). For example, compare module 240 may compare LERG TN data 105 with TSP TN data 115. Compare module 240 may identify differences between LERG TN data 105 and TSP TN data 115. For example, LERG TN data 105 may include TN data that is not present in TSP TN data 115. Additionally, or alternatively, TSP TN data 115 may include TN data that is not present in LERG TN data 105.

It may be determined whether the telephone numbers between the TSP TN data and the LERG TN data match (block 430). As previously described TN data may include telephone numbers and metadata. With respect to the telephone numbers, compare module 240 may determine whether differences exist between the telephone numbers associated with TSP TN data 115 and LERG TN data 105.

If it is determined that the telephone numbers between the TSP TN data and the LERG TN data do not match (block 430—NO), it may be determined whether telephone numbers exist in the LERG TN data and not in the TSP TN data (block 435), as shown in FIG. 4B. If telephone numbers exist in the LERG TN data and not in the TSP TN data (block 435—YES), telephone numbers may be added to the TSP TN data (block 440). In an exemplary implementation, comparer module 240 may provide comparison result data 305 to SQL module 245 so that SQL statements may be generated. Execute and update module 250 may execute the SQL statements and these telephone numbers may be added to TSP TN data 105.

It may be determined whether telephone numbers exist in the TSP TN data and not in the LERG TN data (block 445). If telephone numbers exist in the TSP TN data and not in the LERG TN data (block 445—YES), telephone numbers may be removed from the TSP TN data (block 450). In an exemplary implementation, comparer module 240 may provide comparison result data 305 to SQL module 245 so that SQL statements may be generated. Execute and update module 250 may execute the SQL statements and these telephone numbers may be removed from TSP TN data 105. After block 450 or after block 445—NO, process 400 may continue to block 455 of FIG. 4C.

Referring back to FIG. 4A, if it is determined that the that the telephone numbers between the TSP TN data and the LERG TN data match (block 430—YES), process may continue to block 455 of FIG. 4C. NDMS 110 may update the metadata associated with TN data.

As shown in FIG. 4C, it may be determined whether switch data is changing (block 455). For example, comparer module 240 may determine whether switch data is changing based on the comparison of TSP TN data 115 and LERG TN data 105. When it is determined that switch data is changing (block 455—YES), switch data may be updated (block 460). In an exemplary implementation, comparer module 240 may identify configuration data, telephone numbers, and/or other types of switch data that may need to be changed. In such an instance, comparer module 240 may provide comparison result data 305 to SQL module 245 so that SQL statements may be generated to perform this type of operation. Execute and update module 250 may execute the SQL statements and the switch data may be updated based on execution of the SQL statements.

If switch data is not changing (block 455—NO) or after updating the switch data (block 460), it may be determined whether rate center and/or geographical data is changing (block 465). For example, comparer module 240 may determine whether rate center and/or geographical data is changing based on the comparison of TSP TN data 115 and LERG TN data 105. Rate center data may include, for example, taxes, fees, tariffs, charges, etc., associated with a telephone number and geographical data may include, for example, geographical information (e.g., a state, a city, or the like) associated a telephone number. When it is determined that rate center and/or geographical data is changing (block 465—YES), rate center and/or geographical data may be updated (block 470). In an exemplary implementation, comparer module 240 may identify configuration data and/or telephone numbers that is/are to be associated with a different rate center and/or geographic location. In such an instance, comparer module 240 may provide comparison result data 305 to SQL module 245 so that SQL statements may be generated. Execute and update module 250 may execute the SQL statements and rate center and/or geographical data may be updated based on execution of the SQL statements.

If the rate center and/or geographical data is not changing (block 465—NO) or after updating the rate center and/or geographical data (block 470), it may be determined whether pooling data is changing (block 475). For example, comparer module 240 may determine whether pooling data is changing based on the comparison of TSP TN data 115 and LERG TN data 105. Pooling data may indicate, for example, whether telephone numbers are being received from a pooling administrator or being returned back to the pooling administrator. When it is determined that pooling data is changing (block 475—YES), pooling data may be updated (block 480). Otherwise (block 475—NO), process 400 may end. In an exemplary implementation, comparer module 240 may identify telephone numbers that need to be released or donated back to the pooling administrator since these telephone numbers have not been distributed to customers within a certain period of time. In such an instance, compare module 240 may provide comparison result data 305 to SQL module 245 so that SQL statements may be generated. Execute and update module 250 may execute the SQL statements and pooling data may be updated (i.e., telephone numbers may be released) based on execution of the SQL statements.

Additionally, or alternatively, comparer module 240 may identify newly received telephone numbers. In such an instance, comparer module 240 may provide comparison result data 305 to SQL module 245 so that SQL statements may be generated. Execute and update module 250 may execute the SQL statements and pooling data may be updated (i.e., telephone numbers may be received) based on execution of the SQL statements.

Although FIGS. 4A-4C illustrate an exemplary process 400, in other implementations, additional, fewer, and/or different operations than those described, may be performed. For example, NDMS 110 may update other databases 160, information in other network elements associated with the telephone network, and/or other systems associated with the provisioning of service by the TSP.

The foregoing description of implementations provides illustration, but is not intended to be exhaustive or to limit the implementations to the precise form disclosed. Accordingly, modifications to the implementations described herein may be possible. For example, while SQL statements have been described in this description, other executable statements may be utilized (e.g., Hibernate Query Language (HQL), Java Persistence Query Language (JPQL), some other persistence query methodology, etc.).

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the process illustrated in FIGS. 4A-4C, the order of the blocks may be modified in other implementations. Further, non-dependent blocks may be performed in parallel.

It will be apparent that devices, methods, and/or systems, described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
  receiving, by a network device, Local Exchange Routing Guide (LERG) telephone number (TN) data;
  comparing, by the network device, the LERG TN data with telephone service provider (TSP) TN data;
  determining, by the network device, whether one or more differences exist between the LERG TN data and the TSP TN data based on the comparing;
  generating, by the network device, when the one or more differences exist based on the determining, one or more executable statements that cause the network device to update the one or more differences;
  generating and outputting, by the network device, a report that indicates the one or more differences that exist between the LERG TN data and the TSP TN data, and the one or more executable statements;
  receiving, by the network device, a user input to execute the one or more executable statements;
  executing, by the network device, the one or more executable statements that cause an update of the TSP TN data to match with the LERG TN data, in response to receiving the user input, wherein the executing includes capturing new telephone numbers for a telephone number pool; and
  performing an internal code throw from a switch device to another switch device, in response to the executing, wherein the internal code throw includes moving configuration data from the switch device to the other switch device.

2. The method of claim 1, wherein the one or more executable statements include one or more Structured Query Language (SQL) statements.

3. The method of claim 1, wherein the one or more differences include differences between one or more telephone numbers, and the determining comprises:
  determining whether the one or more telephone numbers exist in the LERG TN data that do not exist in the TSP TN data; and
  wherein the one or more executable statements include one or more executable statements that cause the network device to add the one or more telephone numbers to the TSP TN data, when the one or more telephone numbers exist in the LERG TN data that do not exist in the TSP TN data.

4. The method of claim 1, wherein the one or more differences include differences between one or more telephone numbers, and the determining comprises:
determining whether the one or more telephone numbers exist in the TSP TN data that do not exist in the LERG TN data; and
wherein the one or more executable statements include one or more executable statements that cause the network device to remove the one or more telephone numbers from the TSP TN data, when the one or more telephone numbers exist in the TSP TN data that do not exist in the LERG TN data.

5. The method of claim 1, wherein the one or more differences include one or more differences in switch data associated with one or more switches included in a TSP network.

6. The method of claim 1, wherein the one or more differences include one or more differences in rate center data.

7. The method of claim 1, wherein the one or more differences include one or more differences in pooling data that includes one or more telephone numbers, and the executing comprises:
releasing one or more of the one or more telephone numbers to a telephone number provider.

8. The method of claim 1, further comprising:
reformatting the LERG TN data based on a format associated with the TSP TN data; and
loading the reformatted LERG TN data into a database.

9. The method of claim 1, further comprising:
updating switch data based on the executing, wherein the performing is based on updated switch data.

10. A network device comprising:
one or more memories to store instructions; and
one or more processors to execute the instructions in the one or more memories to:
receive Local Exchange Routing Guide (LERG) telephone number (TN) data;
compare the LERG TN data with TN data;
determine whether one or more differences exist between the LERG TN data and the TN data based on a comparison between the LERG TN data with the TN data;
generate one or more executable statements for updating the TN data when the one or more differences exist between the TN data and the LERG TN data;
generate and output a report that indicates the one or more differences that exist between the LERG TN data and the TSP TN data, and the one or more executable statements;
receive a user input to execute the one or more executable statements;
execute the one or more executable statements that cause an update of the TN data to match the TN data with the LERG TN data, wherein an execution includes capturing new telephone numbers for a telephone number pool; and
perform an internal code throw from a switch device to another switch device, based on the update, wherein the internal code throw includes moving configuration data from the switch device to the other switch device.

11. The network device of claim 10, wherein the TN data includes telephone numbers and rate center data.

12. The network device of claim 10, wherein the TN data includes configuration data associated with switches of a telephone network, and wherein the configuration data is used to update one or more switches associated with the telephone network.

13. The network device of claim 10, wherein the one or more processors are to execute the instructions to:
convert the LERG TN data to a format corresponding to the TN data; and
load the converted LERG TN data and the TN data in a database for the comparison.

14. The network device of claim 10, wherein, when executing, the one or more processors are to execute the instructions to:
release one or more telephone numbers of the TN data to a telephone number provider or a pooling administrator.

15. The network device of claim 10, wherein the one or more executable statements include one or more Structured Query Language (SQL) statements.

16. The network device of claim 10, wherein the network device includes a National Telephone and Address System (NTAS) Data Management System (NDMS).

17. A non-transitory storage medium storing instructions executable by at least one processor, the non-transitory storage medium storing instructions for:
receiving Local Exchange Routing Guide (LERG) telephone number (TN) data;
reformatting the LERG TN data based on a format of TN data associated with a telephone service provider;
comparing the LERG TN data with the TN data;
determining whether one or more differences exist between the LERG TN data and the TN data based on the comparing;
generating one or more executable statements for updating the TN data in correspondence to the LERG TN data when the one or more differences exist between the TN data and the LERG TN data, wherein the one or more executable statements are generated based on a comparison result associated with the comparing;
generating a report that includes the one or more differences and the one or more executable statements;
executing the one or more executable statements to the TN data when a user input is received, wherein the executing includes capturing new telephone numbers for a telephone number pool; and
performing an internal code throw from a switch device to another switch device, in response to the executing, wherein the internal code throw includes moving configuration data from the switch device to the other switch device.

18. The non-transitory storage medium of claim 17, wherein the TN data includes telephone numbers, rate center data, and geographical data.

19. The non-transitory storage medium of claim 17, further comprising one or more instructions for:
releasing telephone numbers from the TN data when the one or more differences correspond to telephone numbers that exist in the TN data but do not exist in the LERG TN data.

20. The non-transitory storage medium of claim 17, further comprising one or more instructions for:
updating TN data associated with network devices of a telephone network in correspondence to updated TN data produced by the executing.

* * * * *